United States Patent [19]
Berding et al.

[11] Patent Number: 5,796,554
[45] Date of Patent: Aug. 18, 1998

[54] LOAD BEAM ASSEMBLY WITH SEPARATE SPRING AND HINGE FUNCTIONS

[75] Inventors: Keith R. Berding; Shawn Casey, both of San Jose, Calif.

[73] Assignee: Western Digital Corporation, Irvine, Calif.

[21] Appl. No.: 831,991

[22] Filed: Apr. 1, 1997

[51] Int. Cl.⁶ .................. G11B 21/08; G11B 5/54
[52] U.S. Cl. .................................................. 360/104
[58] Field of Search ........................................ 360/104

[56] References Cited

U.S. PATENT DOCUMENTS

| | | | |
|---|---|---|---|
| 4,268,879 | 5/1981 | Watrous | 360/104 |
| 4,748,522 | 5/1988 | Takahashi et al. | 360/104 |
| 4,759,119 | 7/1988 | Noguchi et al. | 360/104 |
| 4,811,140 | 3/1989 | Enami et al. | 360/104 |
| 4,875,117 | 10/1989 | Slezak et al. | 360/98.01 |
| 5,012,369 | 4/1991 | Owe et al. | 360/104 |
| 5,185,683 | 2/1993 | Oberg et al. | 360/104 |
| 5,283,704 | 2/1994 | Reidenbach | 360/104 |
| 5,446,611 | 8/1995 | Webber | 360/104 |
| 5,461,525 | 10/1995 | Christianson et al. | 360/104 |
| 5,473,488 | 12/1995 | Gustafson et al. | 360/104 |
| 5,551,145 | 9/1996 | Jurgenson | 29/603.03 |

*Primary Examiner*—Robert S. Tupper
*Attorney, Agent, or Firm*—Leo J. Young; W. Chris Kim; Milad Shara

[57] ABSTRACT

The invention resides in a load beam assembly forming part of a head stack assembly in a magnetic disk drive, the load beam assembly biasing a transducer head against a rotating magnetic disk. The load beam assembly normally has spring and hinge functions combined in a single "spring/hinge" portion of a load beam stamped from a stainless steel sheet. Here, however, the spring and hinge functions are uniquely separated from one another in separate spring and hinge members. The preferred load beam assembly has a base portion, a load beam, and a hinge member joining them so that the load beam pivots relative to the base portion. The load beam is further provided with a bearing surface that cooperates with a preferred spring member, one end of the spring member being fixed relative to the base portion and the other end contacting the bearing surface of the load beam. The preferred spring member is a flat cantilever captured in a plastic base.

66 Claims, 8 Drawing Sheets

5,796,554

1

LOAD BEAM ASSEMBLY WITH SEPARATE SPRING AND HINGE FUNCTIONS

BACKGROUND OF THE INVENTION

1. Appeal of the Invention

The invention relates to a magnetic disk drive ("disk drive") and more particularly to an improved load beam assembly within the disk drive, the improved load beam assembly having structure for performing a spring function and independent structure for performing a hinge function.

2. Description of the Related Art

A conventional disk drive has a head disk assembly including at least one magnetic disk ("disk"), a spindle motor for rapidly rotating the disk, and a head stack assembly that includes a transducer head ("head") for reading and writing data. The head stack assembly is controllably positioned by a servo system in order to read or write information on the disk. The typical head stack assembly has two primary portions: (1) an actuator assembly that moves in response to the servo control system and (2) a head gimbal assembly ("HGA") that extends from the actuator assembly and biases the head towards the disk.

The industry presently prefers a "rotary" actuator assembly including an actuator body that rotates on a pivot assembly, a coil that extends from one side of the actuator body to interact with a pair of permanent magnets to form a voice coil motor for moving the actuator body, and an actuator arm that extends from an opposite side of the actuator body to support the head gimbal assembly.

The conventional HGA includes a suspension assembly, wires, and a head. The suspension assembly itself comprises a load beam assembly and a gimbal. The load beam assembly has an actuator end that connects to the actuator arm and a gimbal end that connects to the gimbal which carries the head and transmits a biasing force to the head to "load" it against the disk with a biasing force known as a gram load.

A rapidly spinning disk develops a laminar air flow above its surface that lifts the head away from the disk in opposition to the gram load biasing force. The head is said to be "flying" over the disk when in this state. The load beam assembly has a spring function which provides the gram load biasing force and a hinge function which permits the head to follow the surface contour of the spinning disk.

FIG. 3 shows a typical HGA having a load beam assembly that was formed from a thin sheet of stainless steel. The industry sometimes refers to a region 83 of this load beam assembly as a "spring hinge" because it functions both as a spring and as a hinge. One prior patent disclosing a "spring hinge" is U.S. Pat. No. 5,283,704, issued to John R. Reidenbach on Feb. 1, 1994, and entitled "ROTARY ACTUATOR FOR DISK DRIVE ASSEMBLIES."

The spring hinge 83 is commonly defined by a cut-out 80 which defines web members 81 that make the spring hinge more flexible. A spring hinge 83, however, detrimentally requires a number of engineering compromises to optimize competing interests within a particular load beam assembly. When designing a spring hinge 83 for a load beam assembly, for example, the spring hinge 83 should be soft in the bending direction, yet very stiff in both the lateral and torsional motions. The bending softness is necessary so that variations in the Z-height due to drive component tolerances do not dramatically affect gram load imparted to the transducer head. Torsional and lateral stiffness is desired to minimize the affect of resonances which can cause the transducer to oscillate off track.

2

Since for increased torsional and lateral stiffness it is desirable to shorten the web members 81 by shortening the cutout 80, a corresponding decrease in material thickness is necessary to maintain the same desired bending stiffness. But in a spring hinge suspension, all of the "load" is provided by the web members 81 which serve both as a spring and as a hinge. Therefore, for a given gram load, the stress levels in the web members 81 increase as the thickness is decreased (inversely with the thickness squared). High stress levels lead to undesirable "degramming" when the HGA's are separated by combs during the manufacturing process and during shipping. Because of this, traditional spring hinge designs incorporate relatively thick stainless steel (0.003") with a relatively long cutout 80 (e.g. 0.130") to define the soft bending stiffness at the expense of torsional stiffness. As a result, special design and controls of hinge geometry are necessary in order to control the off track gain of the first torsional mode. These special controls require a fine tuned process, tight process controls, and therefore add cost. In addition, the web members 81 are formed to provide the proper pre-load and then stress relieved with some form of heating (IR heat or hot gas).

Others have attempted to produce a multiple component head gimbal assembly as shown, for example, in FIG. 4 and described in U.S. Pat. No. 5,185,683, issued to Gary R. Oberg, et al. on Feb. 9, 1993, entitled "SUSPENSION ARM MOUNTING ASSEMBLY." The head gimbal assembly of FIG. 4 has a plastic base plate 102 and plastic load beam 106 that are connected together by "stabilizer bars" 122 above a metal strip 114. Oberg et al. describe their metal strip 114 as a "spring" and further claim that their "stabilizer bars" 122 function as a "hinge." The Oberg et al. device, however, suffers from the same detriments as the device shown in FIG. 3 because the metal strip 114 is fastened to both the base 102 and the load beam 106 forming a "box" structure which in combination is inherently a "spring hinge."

A load beam assembly appears deceptively simple, but performs a number of complicated functions. It provides the gram load biasing force needed to properly fly the head. It must provide a minimal and predictable gram load variation over a high volume manufacturing process as the assembly and parts tolerances can cause a Z-height range of about ±0.008". It must also follow the surface contour of the rotating disk. The load beam assembly must provide lateral, longitudinal, and torsional stiffness in supporting the gimbal and head so that the servo system can keep the head over a desired data track. These goals must be achieved at relatively low cost due to the competitive market in which disk drives are sold. The prior art load beam assemblies have largely achieved these goals. Significant advancements in cost and performance could still be obtained, however, by eliminating the compromises required by the conventional "spring hinge" structure.

Accordingly, there is a need for a disk drive having an improved load beam assembly wherein the spring and hinge functions are separate from one another as unique spring and hinge members. This invention allows the use of thin material for short, torsionally stiff hinges members, with stress levels near zero at nominal Z-height since the separate spring member carries almost all of the load. Moreover, such load beam assemblies may be manufactured without tight control since the hinge member is not formed and the geometry will be naturally controlled. In the preferred embodiment, there is no forming of either the hinge member or the spring member, the latter being a simple flat cantilever captured in plastic.

SUMMARY OF INVENTION

In a first aspect, the invention may be regarded as a load beam assembly for attachment to an actuator arm and for carrying a head. The load beam assembly comprises a base portion having a base actuator end and a base hinge end, and an elongated load beam having a load beam hinge end, a load beam gimbal end, and a bearing surface, the base portion and elongated load beam defining a longitudinal axis extending from the base portion to the load beam gimbal end. Further included are a hinge means for joining the base hinge end to the load beam hinge end, the hinge means defining a transverse axis. A gimbal means attached to the load beam gimbal supports the head. Finally provided is a spring member having opposite ends with a near end fixed relative to the base portion and a far end contacting the bearing surface, whereby the spring member applies a gram load to the gimbal means via the bearing surface as the load beam pivots about the transverse axis, thereby allowing a narrow range of gram load variation over a wide range of manufactured load beam assemblies.

In a second aspect, the invention may be regarded as a head stack assembly for a magnetic disk drive having a coil, an actuator body, an actuator arm, and a head gimbal assembly for carrying a head over a magnetic disk and applying a gram load to the head, the head gimbal assembly comprising a head for reading recorded magnetic data; connection means for carrying signals from the head; and a load beam assembly as described above.

In a third aspect, the invention may be regarded as a magnetic disk drive having a disk and a head stack assembly, the head stack assembly having a coil, an actuator body, an actuator arm, and a head gimbal assembly for carrying a head over a magnetic disk and applying a gram load to the head, the head gimbal assembly comprising a head for reading recorded magnetic data; connection means for carrying signals from the head; and a load beam assembly as described above.

DETAILED DESCRIPTION OF THE PREFERRED EMBODIMENT

Figure 1:
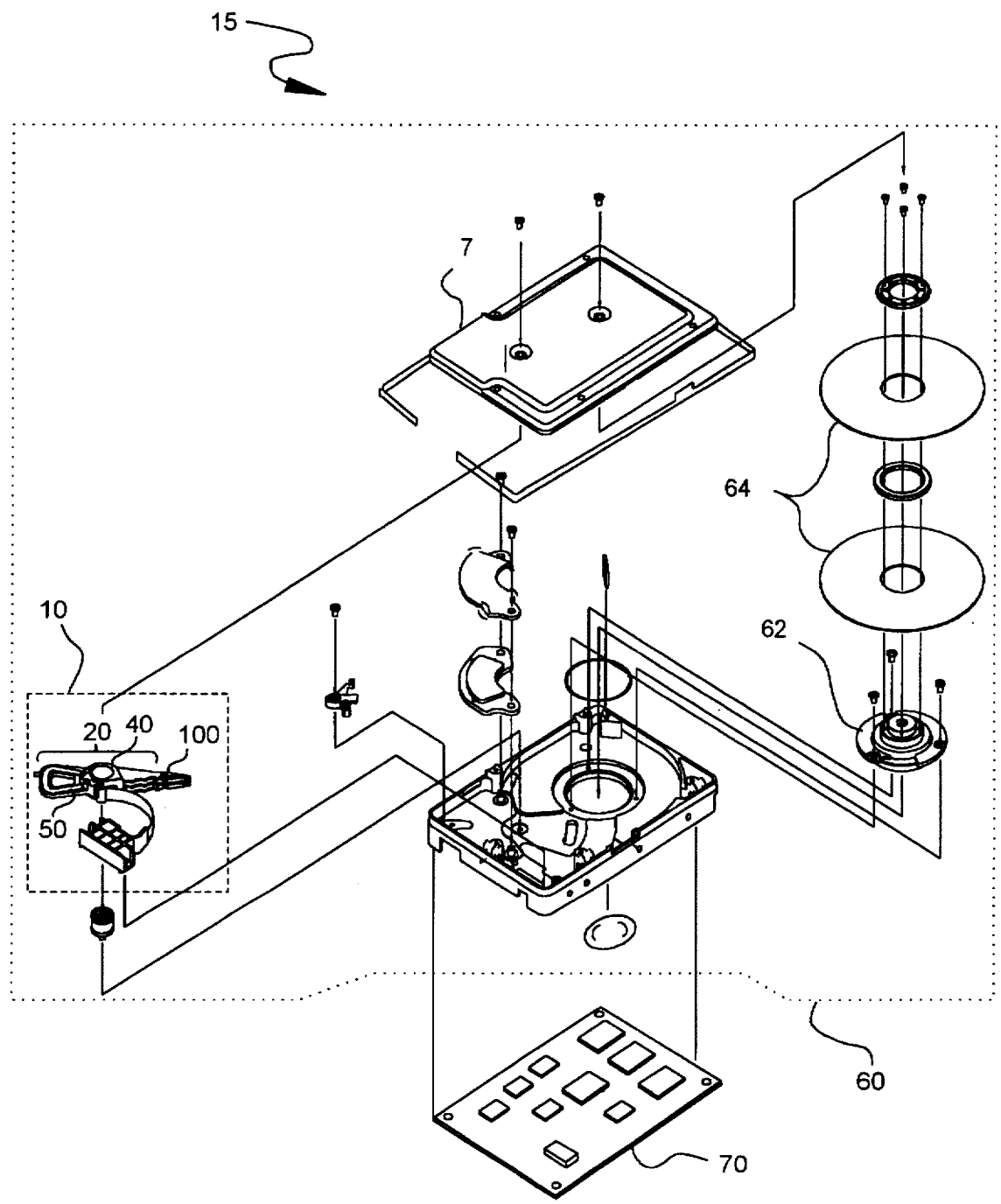
FIG. 1 is an exploded perspective view of a magnetic disk drive 15 having a head disk assembly 60 including a head stack assembly 10 having a rotary actuator assembly 20 and a plurality of head gimbal assemblies 100.

FIG. 1 shows the principal components of a disk drive 15 constructed in accordance with a preferred embodiment of the invention. The disk drive 15 shown is an integrated drive electronics (IDE) drive, comprising a head disk assembly (HDA) 60 and a controller circuit board 70.

The HDA 60 of FIG. 1 comprises a magnetic disk 64 (2 shown), a spindle motor 62 for rapidly rotating the disk 64, and a head stack assembly 10 located next to the disk 64. The head stack assembly 10 comprises an actuator assembly 20 and a plurality of head gimbal assemblies 100. Each head gimbal assembly 100 comprises a load beam assembly 110 and a head 140 supported by gimbal means 180, as conceptually shown in FIG. 5. The actuator assembly 20 comprises a voice coil 50, an actuator body 40, and actuator arms 31, 32 (see FIG. 2). The head stack assembly 10 is located so that the head 140 of the head gimbal assembly 100 is biased towards and moveable over the disk 64. The HDA's storage capacity may be increased, as shown in FIG. 1, by including several disks 64 and a head stack assembly 10 having a vertical "stack" of head gimbal assemblies 100 and associated heads 140 for each surface of each disk 64, the head gimbal assemblies 100 supported by multiple actuator arms 31, 32.

Figure 2:
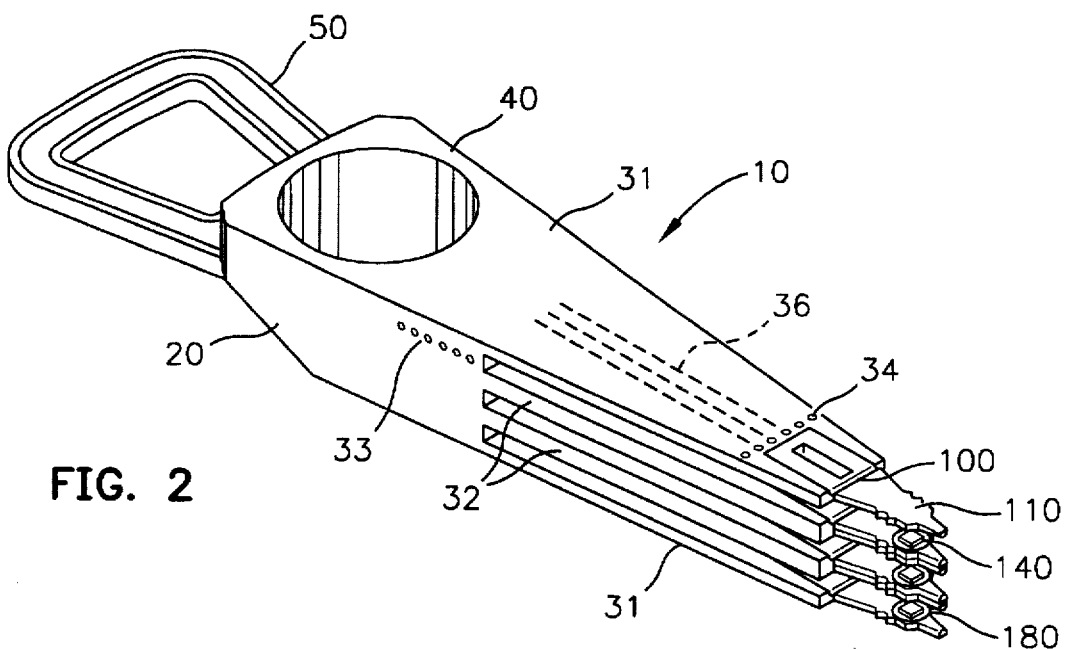
FIG. 2 is a perspective view of the head stack assembly 10 of FIG. 1, showing the outer actuator arms 31 that each support one head gimbal assembly 100, and inner actuator arms 32 that each support two head gimbal assemblies 100.

As best shown in FIG. 2, actuator assembly 20 is preferably an integrally molded structure wherein the voice coil 50 and actuator arms 31, 32 are simultaneously molded with the actuator body 40. Alternatively, the voice coil 50 and actuator arms 31, 32 may be pre-formed and then insert molded into the actuator body 40. The actuator arms 31, 32 may also be injection molded components and, as further shown in FIG. 2, may include internal conductors 36 with a first plurality of conductive pads or pins 33 exposed on the side of the actuator body 40 and a second plurality of conductive pads 34 exposed at a far end and on one side of an outer actuator arm 31 and on both sides of an inner actuator arm 32. The conductors 36, conductive pins 33, and conductive pads 34 are used to communicate read and write signals and to provide a ground path between the heads 140 and the controller circuit board 70.

As further shown in FIG. 2, the preferred head gimbal assembly 100 comprises a load beam assembly 110, a head 140, a gimbal means 180 for supporting the head 140, and a conductive means for carrying signals to and from the head 140.

Figure 5:
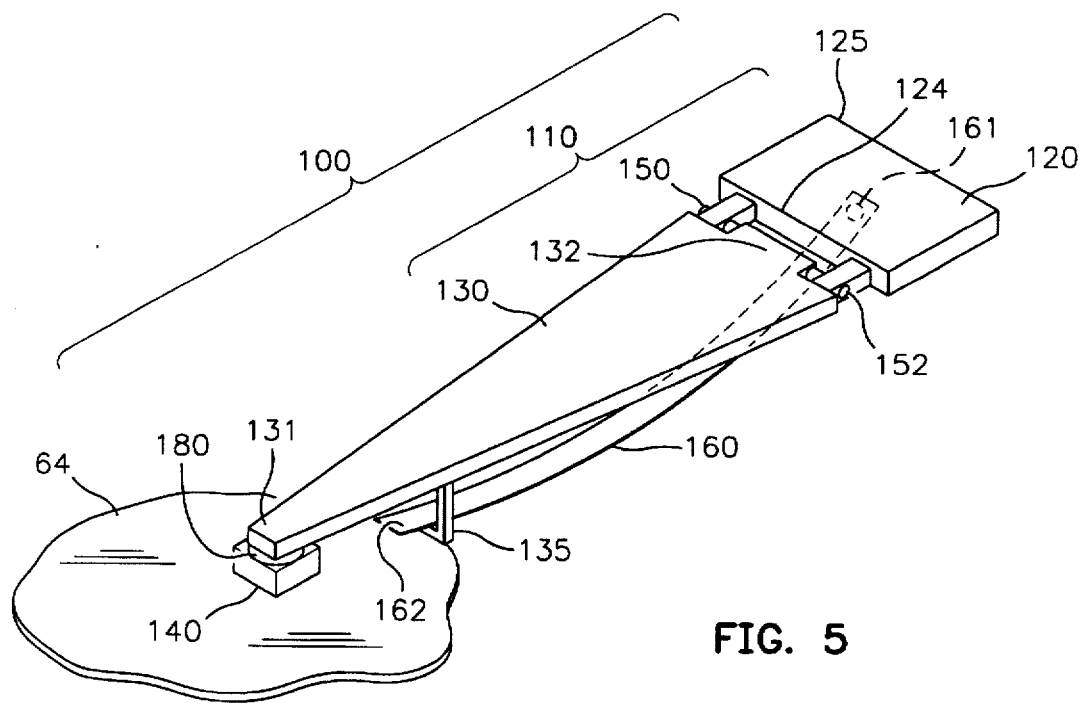
FIG. 5 is a diagrammatic perspective view of a load beam assembly 110 according to the invention wherein a base portion 120 and an elongated load beam 130 are connected together by a hinge means 150, and wherein a separate spring member 160 is fixed to the base portion 120 and slidably biases against a bearing surface 135 of the load beam 130.

FIG. 5 generally shows the conceptual construction of a load beam assembly 110 according to the invention in the context of an overall head gimbal assembly 100. As shown, the load beam assembly 110 comprises a base portion 120, a load beam 130 having a gimbal end 131 and a bearing surface 135, a hinge means 150 for pivotally connecting a load beam hinge end 132 of the load beam 130 to a base hinge end 124 of the base portion 120, and an elongated spring member 160 that arches along a longitudinal axis of the assembly, the spring member 160 having a near end 161 that is fixed to the base portion 120 and a far end 162 that slidably contacts the bearing surface 135 of the load beam 130 as it pivots about the transverse axis. A gimbal means 180 for supporting a head 140 over a disk 64 is attached to the gimbal end 131 of the load beam 130. The base portion 120 preferably has a base actuator end 125 that releasably connects to an actuator arm 31, 32, as further discussed below.

The spring member must be fixed relative to the base portion 120 and the preferred spring member has its near end 161 fixed directly to the base portion 120. It is possible, of course, to use a different type of spring member that is fixed to a cantilevered member, for example, which cantilevered member is, in turn, fixed to the base portion 120.

The hinge means 150 of FIG. 5 functions as a "true hinge" because it does not flex, but rather provides rotation about a hinge pin 152 and offers little or no spring-like resistance to movement. Conversely stated, the unique structure of FIG. 5 has moved most or all of the spring function into the spring member 160. A hinge comparable to that of FIG. 5 could, of course, be formed from any rotating, non-flexing interface.

A significant benefit results from this unique separation of the hinge and spring functions. In a conventional spring hinge, the designer would make the web member shorter, thicker, and wider to improve stiffness in lateral and torsional motions. But he is constrained to a design which provides the proper gram load and bending compliance without excessive stress in the web material. This results in a design that is neither optimal in torsional/lateral stiffness, nor optimal in bending softness. Therefore, special controls of spring/hinge geometry are required to control torsional resonance, and gram load changes with variation in Z-height is greater than desired. The industry generally establishes the spring function of a conventional load beam assembly, one of the "hinge spring" variety, by starting with a sheet of a particular thickness (say 3 mils) and then determining the length of the cutout 80 that provides the spring constant needed for the desired gram load. A thicker sheet could be used with a longer cutout 80, or vice versa, to achieve the same spring constant. A shorter cutout improves lateral and torsional stiffness, but increases the bending stiffness. If the material thickness is decreases, the stress increases for a given gram load. A longer cutout reduces the bending stiffness, but makes the load beam assembly torsionally soft. A spring member 160 according to the invention, however, is isolated from the hinge function and does not have to provide the stiffness. Accordingly, the spring member 160 may have reduced spring rate that translates to a reduced gram load variation. In addition, if a flexure hinge is used, it can be made thin and short since the stress can be near zero at nominal Z-height.

Figure 8:
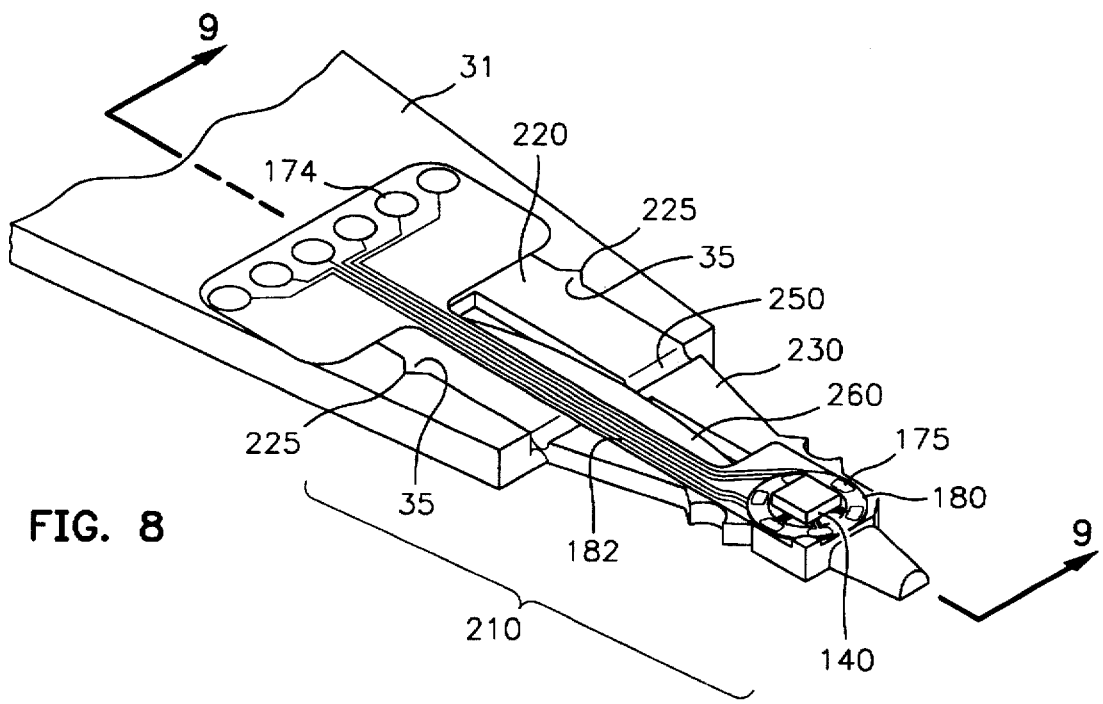
FIG. 8 is a perspective view of an outer actuator arm 31 connected to a load beam assembly 210.

FIG. 8 shows a preferred load beam assembly 210 according to the invention. As shown, a base 220, a load beam 230, and a hinge member 250 are all integrally formed from a common injection molded component. The hinge member 250 is defined as a "living hinge" through the use of a reduced thickness in material. The hinge member 250 is not a "true" hinge 150 like that shown in FIG. 5, but for all practical purposes, the spring-like characteristics of the hinge member 250 are negligible compared to those of the spring member 260. The spring member 260 preferably comprises a spring strip 260 formed from cold rolled austenitic, stainless steel. The preferred spring strip 260 is about 0.0025" thick, 0.030" wide, and 0.425" long. The material composition and dimensions of the spring strip 260 may be easily varied to achieve a predetermined spring rate suitable for a given application and, beneficially, without any concern for hinge related functionality.

Figure 6:
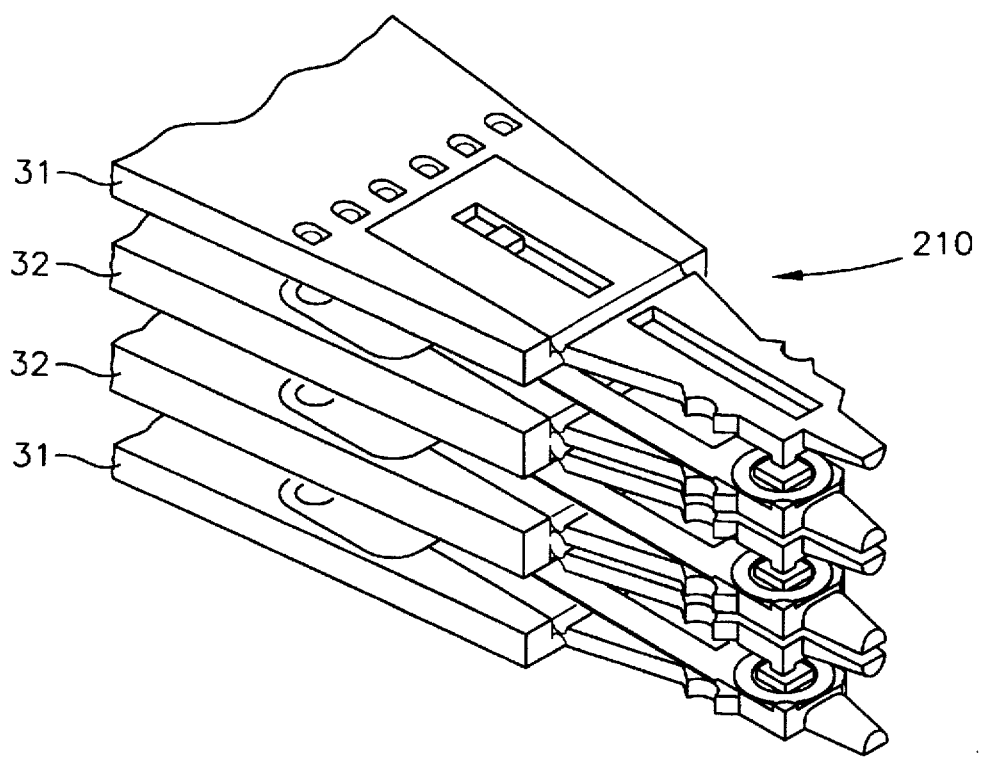
FIG. 6 is a perspective view of a portion of head stack assembly 10 having a plurality of load beam assemblies 210 according to a preferred embodiment of the invention.

FIG. 6 shows a portion of a preferred head stack assembly 10 including a "stack" of preferred load beam assemblies 210 attached to outer actuator arms 31 and inner actuator arms 32.

Figure 3:
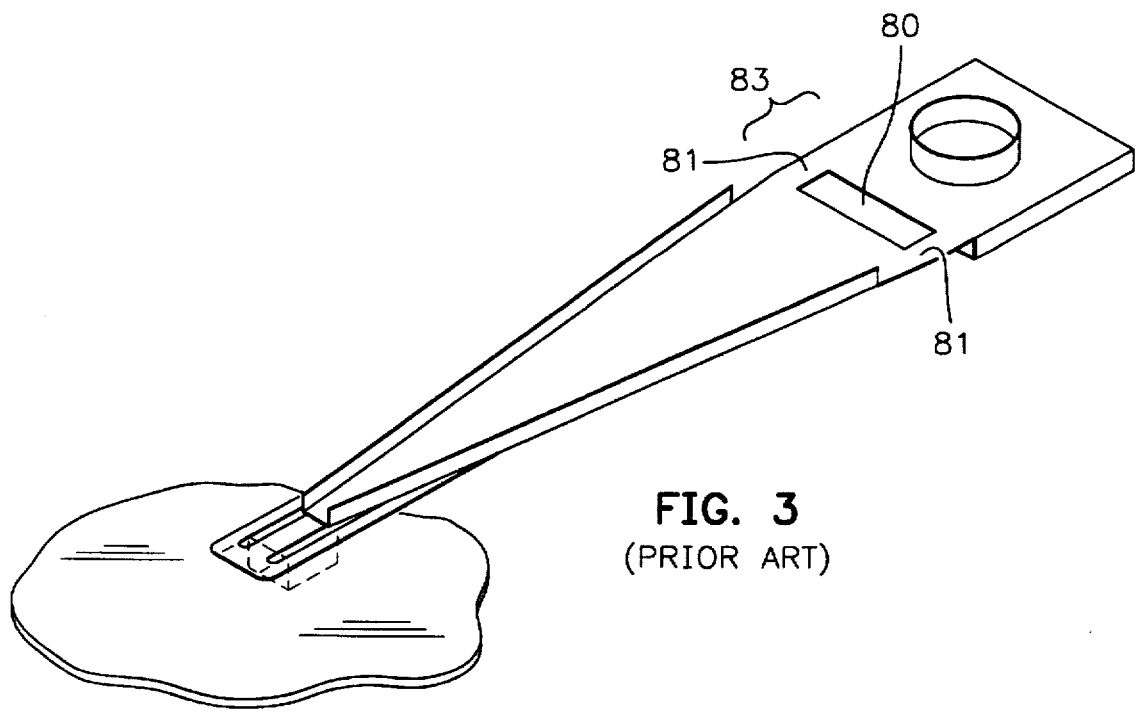
FIG. 3 is a perspective view of a conventional head gimbal assembly incorporating a spring hinge 83 defined by a cutout 80 and associated web members 81.
Figure 4:
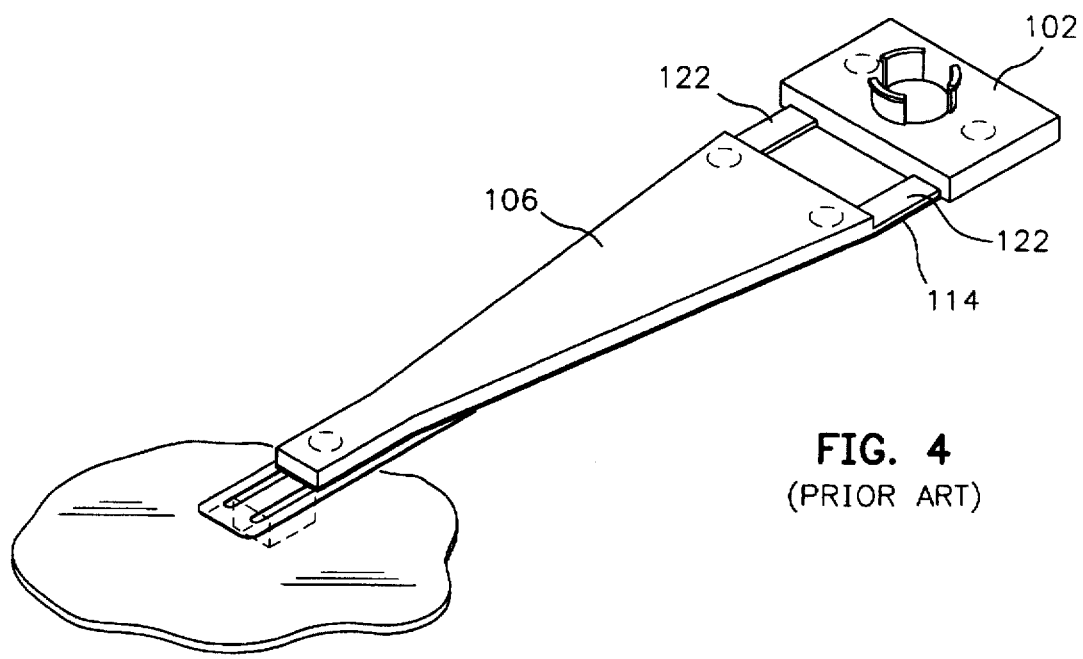
FIG. 4 is a perspective view of a prior art head gimbal assembly wherein a spring hinge 114 connects a plastic base plate 102 and a plastic load beam 106.
Figure 9:
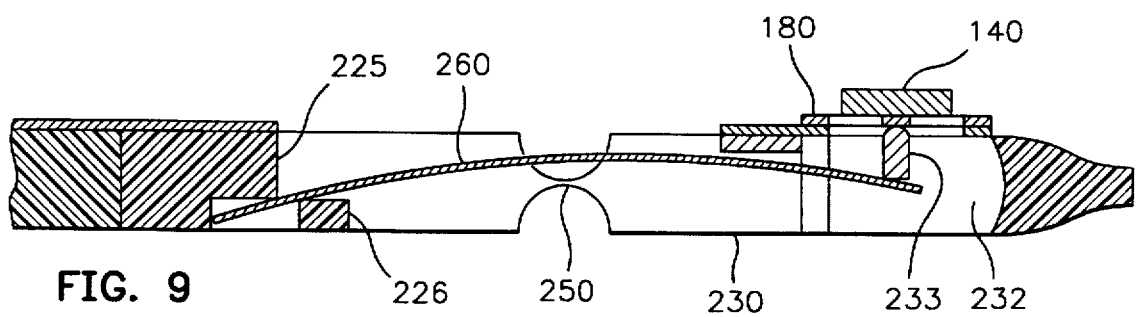
FIG. 9 is a sectional view of the outer actuator arm 31 and load beam assembly 210 of FIG. 8 taken along section lines 9—9.

As best shown in FIG. 9, the spring strip 260 extends from between a notched anchor block 225 and a support block 226 toward a cross-member 233 located at a gimbal end 232 of the load beam 230. The cross-member 233 defines a bearing surface along which the spring strip 260 may slide as the load beam 230 pivots about the hinge member 250. The spring strip 260 biases the gimbal end 232 of the load beam 230 upward about a transverse rotational axis of the hinge member 250. As a result, a head 140 supported by a gimbal means 180 on the load beam 230 is biased towards the disk 64 (not shown) with a predetermined gram load biasing force. Although it is difficult to achieve a consistent gram load and gram load variation for a given head movement with the prior art head gimbal assemblies of FIGS. 3 and 4, it is a relatively simple matter to vary the spring rate of the spring strip 260 to bias the head 140 towards the disk 64 with a consistent gram load and with minimal gram load variation over a volume manufacturing process. Moreover, if the spring member 260 is bent during handling, or if it does not provide the desired gram load after being installed, the spring member 260 can be easily removed and replaced. The entire assembly of FIG. 3, however, would ordinarily be wasted given such events.

Figure 9A:
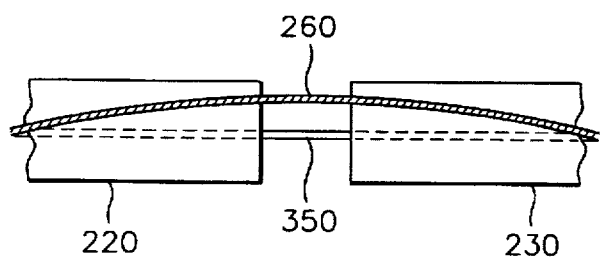
FIG. 9a is a partial sectional view of a first alternative hinge structure.
Figure 9B:
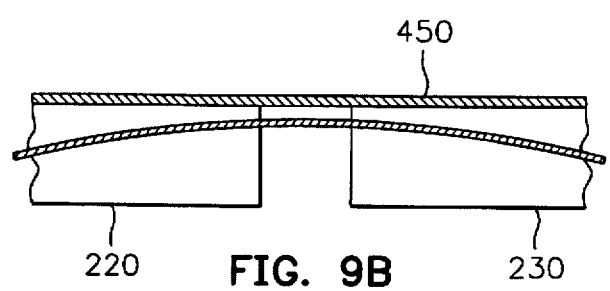
FIG. 9b is a partial sectional view of a second alternative hinge structure.

FIGS. 9A and 9B show alternative hinge members which may be used with a load beam assembly 210 according to the invention.

In FIG. 9A, a strip of metal 350 such as stainless steel or beryllium copper is bonded or otherwise connected between the base 220 and the load beam 230. The base 220 and load beam 230 may be plastic as was shown in FIG. 9. Several metal strips 350 may also be used to carry read and write signals in addition to serving as a hinge member. In FIG. 9B, a flex circuit 450 is connected between the base 220 and the load beam 230. The flex circuit 450 uniquely carries conductors for communicating the read and write signals and also physically serves as a hinge member.

Figure 10:
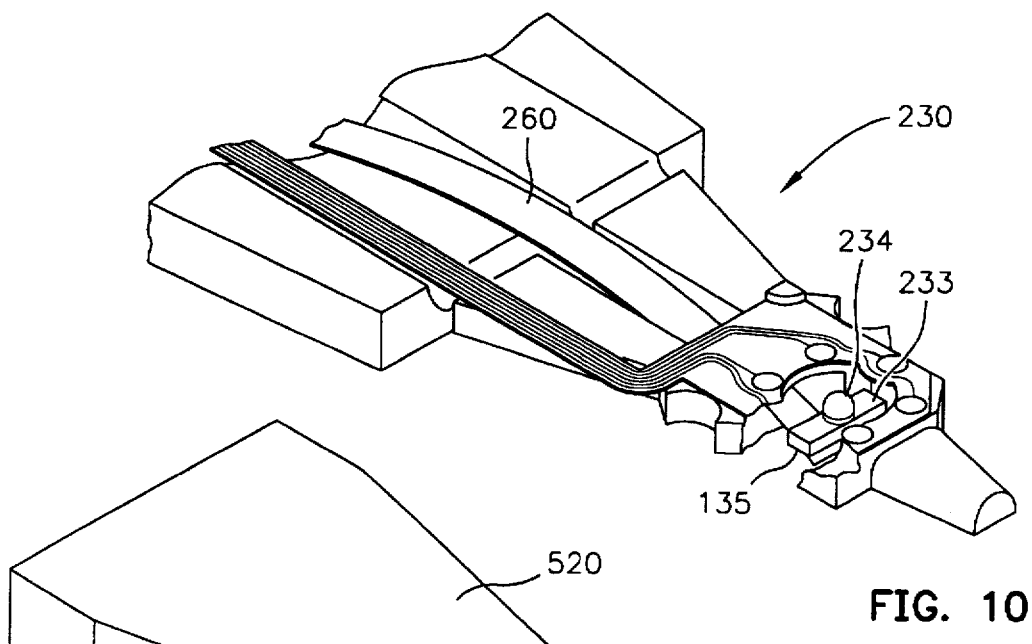
FIG. 10 is a close-up perspective, cut-away view of the far end of the load beam assembly 210 of FIG. 8 with the gimbal ring 180 and head 140 removed to reveal the cross-member 233 which forms a preferred bearing surface that slidably contacts the spring member 260.

FIG. 10 is a close up perspective, cut-away view of the load beam 230 of FIG. 8 with the gimbal ring 180 and the head 140 removed to reveal the sliding contact between the spring member 260 and the bearing surface 135 of the load beam's cross-member 233. FIG. 10 also shows a preferred spherical load point 234 which pivotally supports a back side of the gimbal ring 180 and head 140.

Figure 7:
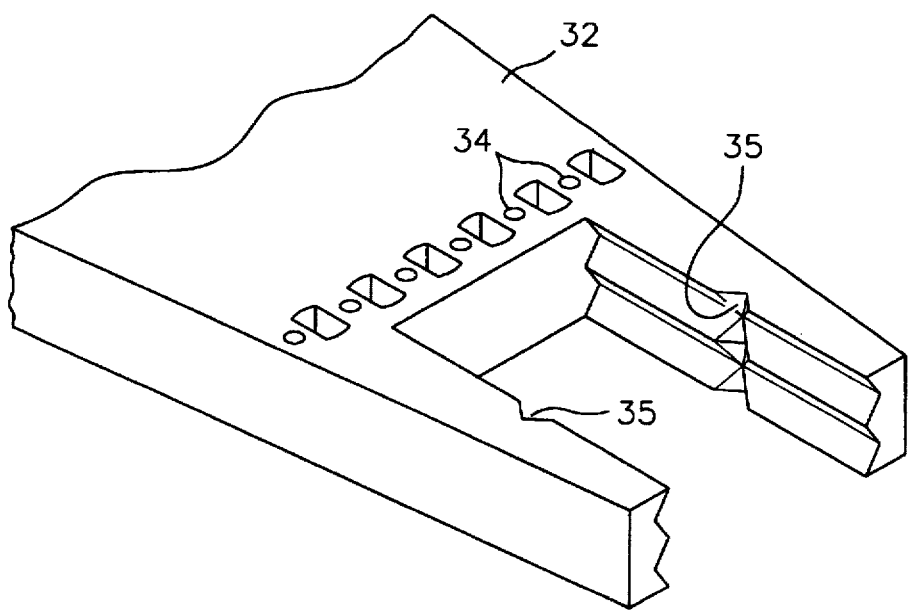
FIG. 7 is a perspective view of an inner actuator arm 32 which includes means for releasable connection to a pair of load beam assemblies 210.

Preferably, means are provided for releasably connecting the base 220 to the actuator arms 31, 32. FIGS. 7 and 8 show a preferred releasable connection means.

As shown in FIG. 8, when the base 220 is fully inserted into an upper or lower actuator arm 31 of FIG. 8, a pair of opposed detents 225 engage corresponding notches 35 in the actuator arm 31. Two bases 220 can be similarly connected to an inner actuator arm 32 with one having its head facing an upper disk and the other having its head facing a lower disk by providing the inner actuator arm 32 with two pairs of opposed notches 35 in a vertically stacked arrangement as shown in FIG. 7.

As may be further appreciated from FIGS. 7 and 8, the preferred actuators 31, 32 carry internal conductors 36 that interconnect conductive pads 33 on the actuator body (see FIG. 2) with conductive pads 34 exposed at a far end of the actuator arms 31, 32. The conductive pads 34 are electrically connected to the heads 140 via corresponding conductive pads 174 on a flex actuator end of a flex circuit 182 as shown in FIG. 8. A flex gimbal end of the flex circuit 182 preferably terminates with conductive pads 175 arranged in a circle to interface with a unique gimbal ring 180 that also comprises flex material. The gimbal ring 180 may be beneficially replaced or "reworked" to repair an otherwise functional head gimbal assembly 100 to minimize waste during manufacturing and assembly.

Figure 11A:
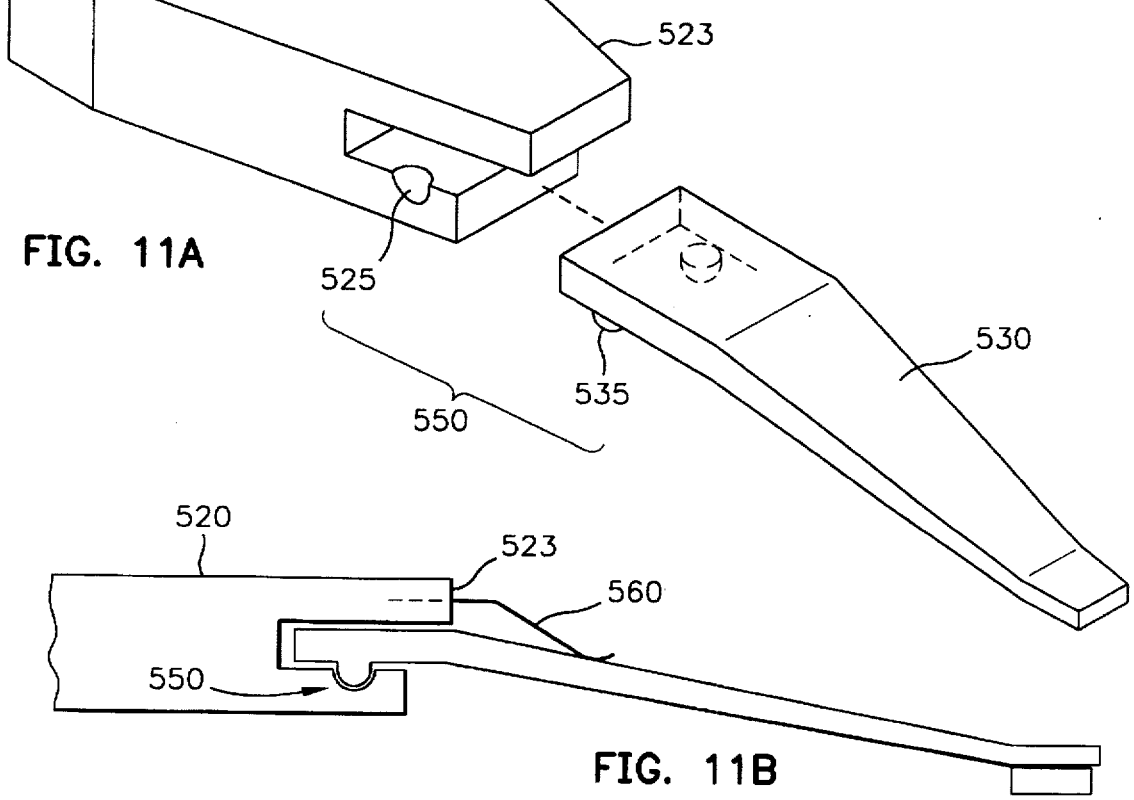
FIGS. 11A, 11B and 11C show a load beam assembly with a third alternative hinge structure involving a ball and socket arrangement.
Figure 11B:
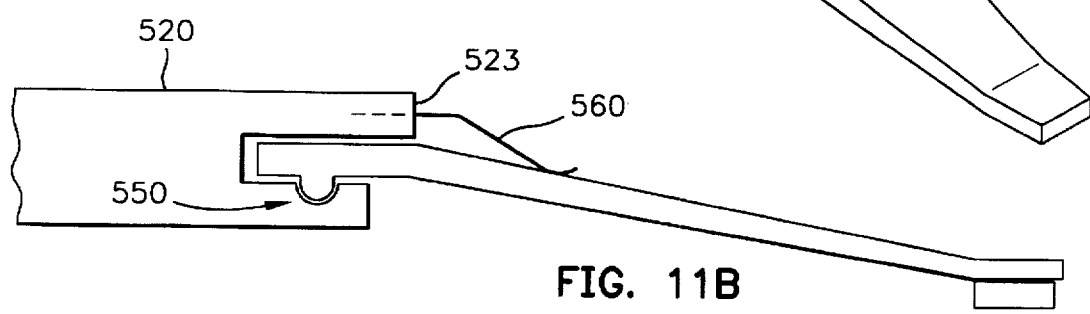
Figure 11C:
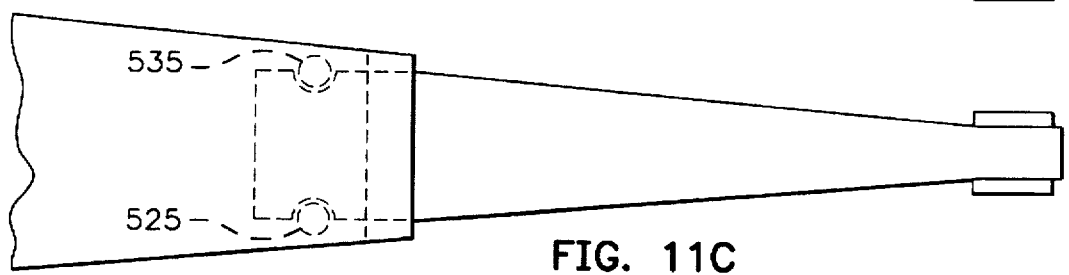

FIG. 11A, 11B and 11C show a third alternative hinge 550 involving a ball and socket arrangement. The hinge 550 provides hinging action between a pair of ball detents 535 on the load beam 530 and a corresponding pair of sockets 525 in the base 520. An alternative spring member 560 extends from the base 520 to bias the load beam 530 about the hinge assembly 550. An alternative to the balls 535 and sockets 525 which can reduce friction is to replace the balls 535 with knife edges (not shown). An added benefit of the structures shown in FIGS. 11A–11C is that a top portion 523 of the base 520 limits the movement of the load beam 530. A special "shipping comb" must ordinarily be inserted into a head stack assembly to separate the heads 140 before mating the assembly with a stack of disks. The interaction between the load beam 530 and the top portion 523 of the base 520, however, would beneficially eliminate the need for such a pre-assembly comb.

A variety of alternative spring members may be used in the invention instead of the presently preferred spring member 260.

Figure 12:
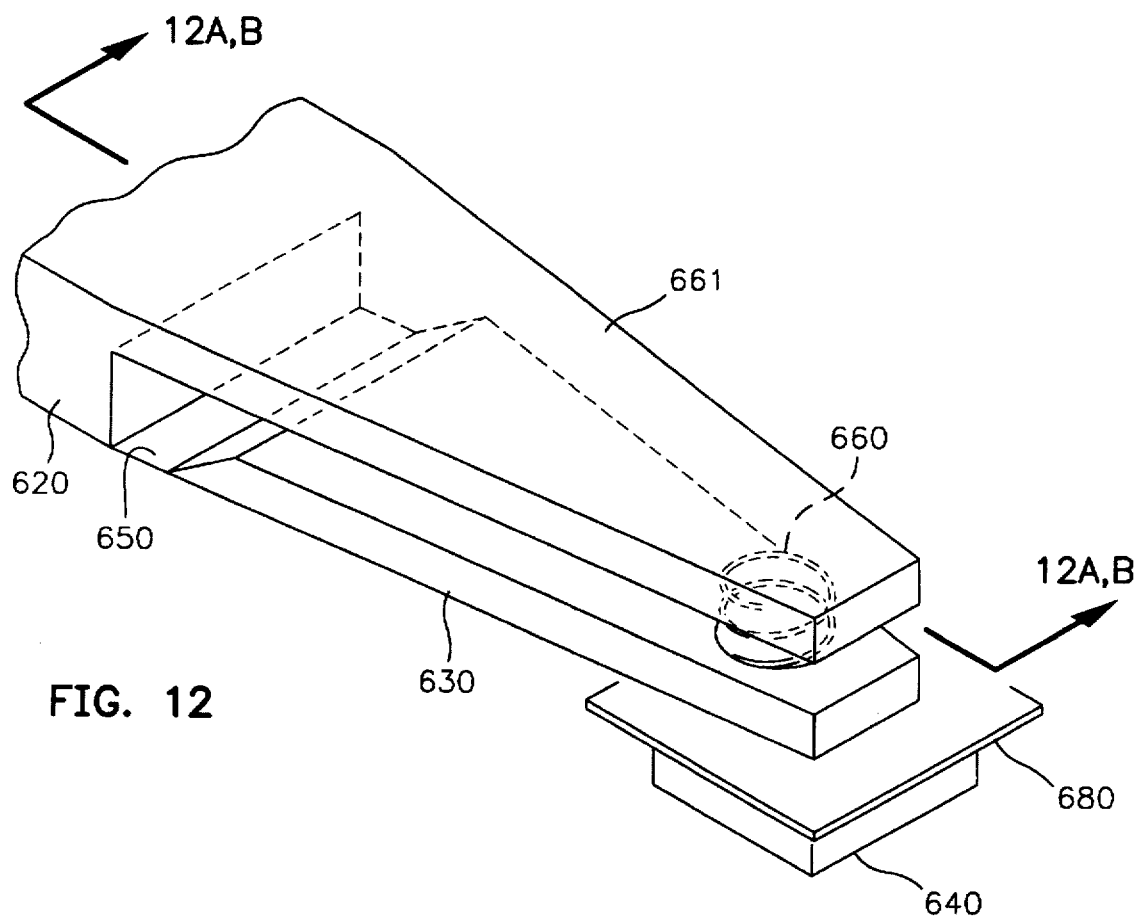
FIGS. 12, 12A, and 12B show a load beam assembly with second and third alternative spring members 660, 660' that are indirectly affixed to the base portion 620 via a fixed arm extension 661.
Figure 12A:
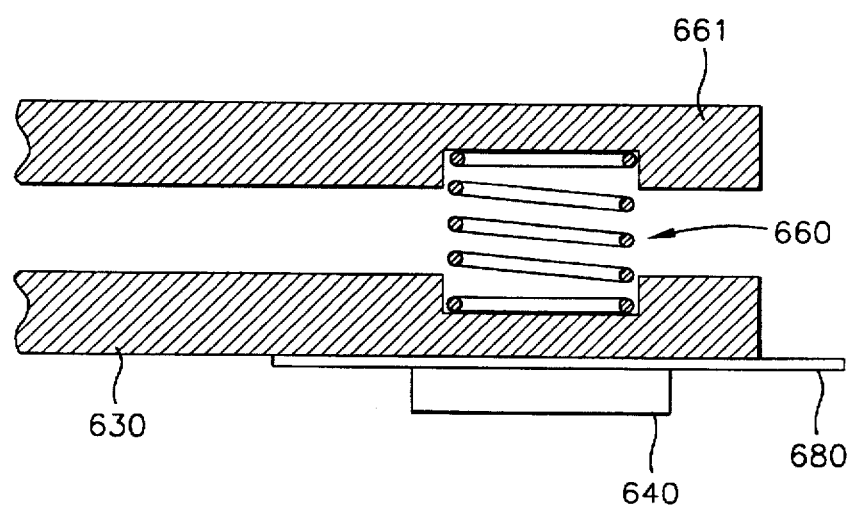
Figure 12B:
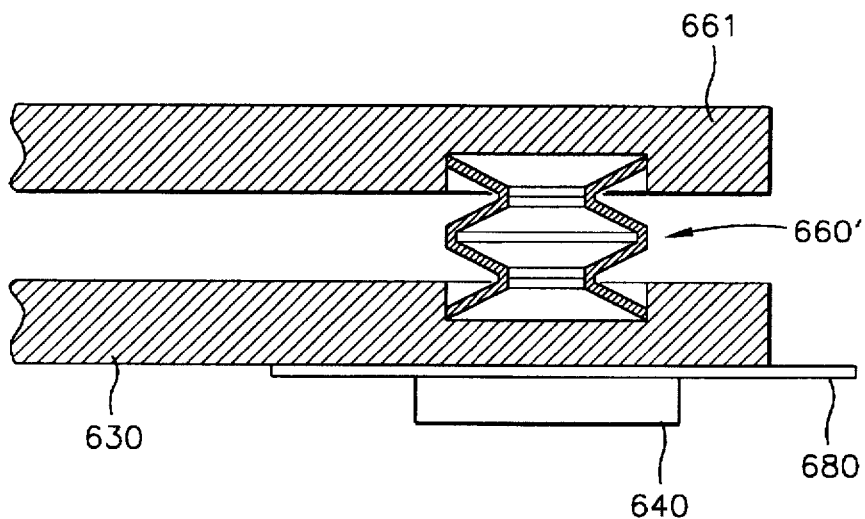

FIGS. 12, 12A, and 12B, for example, show a load beam assembly with a base portion 620, a load beam 630 which carries a gimbal 680 and a transducer head 640, a hinge member 650 that pivotally connects the load beam 630 to the base portion 620, and second and third alternative spring members 660, 660' that are indirectly affixed to the base portion 620 via a fixed arm extension 661. In FIGS. 12 and 12A, the second alternative spring member 660 comprises a coil spring. In FIG. 12B, the spring member 660' comprises at least one nonlinear disk spring.

Figure 13:
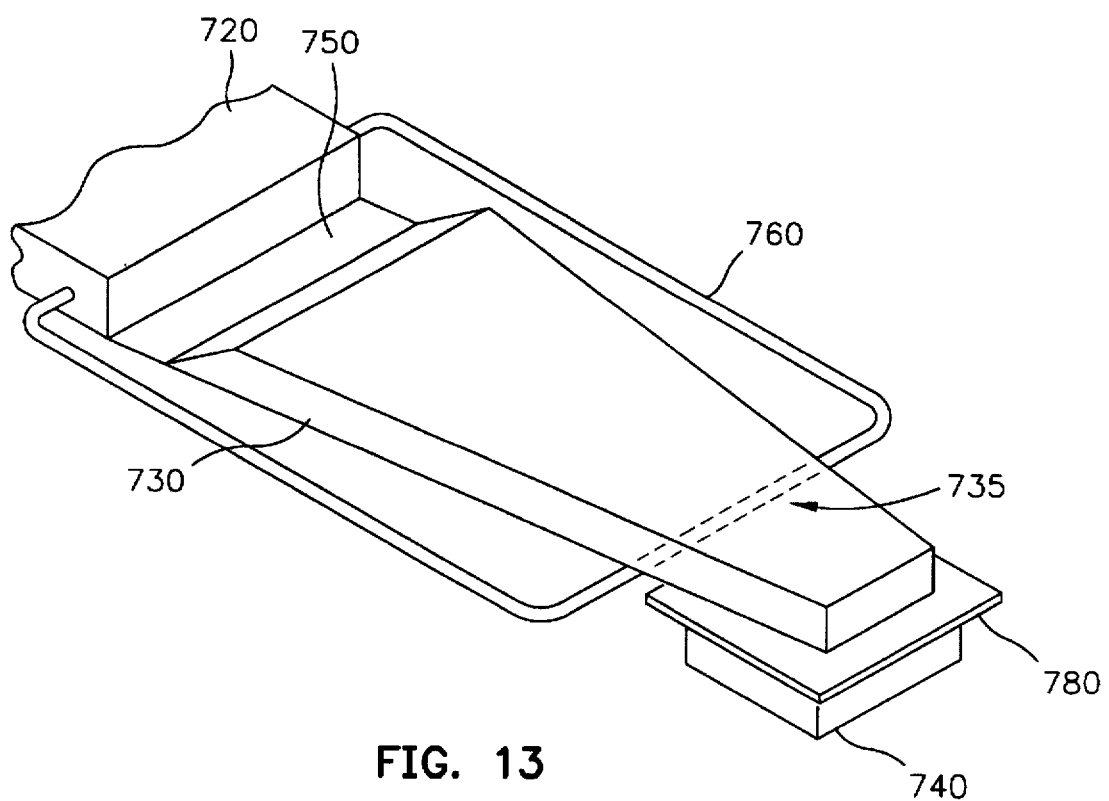
FIG. 13 shows a load beam assembly with a fourth alternative spring member 760.

FIG. 13 shows a load beam assembly with a base portion 720, a load beam 730 which carries a gimbal 780 and a transducer head 740, a hinge member 750 that pivotally connects the load beam 730 to the base portion 720, and a fourth alternative spring member 760 comprising a wire loop. The wire loop 760 makes sliding contact with a bearing surface 735 on the topside of the load beam 730.

The above disclosure has been provided to teach an innovative load beam assembly 110 that by itself or in combination with a head stack assembly 10 or overall disk drive 15, separates the hinge and spring functions needed to bias a head 140 towards a disk 64. The resulting device provides a more consistent spring constant and may be manufactured at less cost and with less waste and higher yield.

We claim:

1. A load beam assembly for attachment to an actuator arm in a disk drive, the disk drive having a disk, and the actuator arm for carrying a transducer head, the load beam assembly comprising:

a base portion having a base actuator end and a base hinge end;

an elongated load beam having a load beam hinge end, a load beam gimbal end, a first surface facing towards the disk and a second surface facing away from the disk, and a bearing surface;

hinge means joining the base hinge end to the load beam hinge end, the hinge means defining a transverse axis;

the base portion, the load beam, and the hinge means being positioned to define a longitudinal axis extending from the base portion to the load beam gimbal end;

gimbal means for supporting the transducer head, the gimbal means being attached to the load beam gimbal end; and a spring member having opposite ends, a near end fixed relative to the base portion, and a far end for slidably contacting the bearing surface;

the far end of the spring member positioned between the second surface and the transducer head;

whereby the spring member applies a gram load to the gimbal means via the bearing surface as the load beam pivots about the transverse axis, thereby allowing a narrow range of gram load variation over a wide range of manufactured load beam assemblies.

2. The load beam assembly of claim 1 wherein the spring member is an elongated spring member arching along the longitudinal axis.

3. The load beam assembly of claim 2 wherein the near end of the elongated spring member is fixed directly to the base portion.

4. The load beam assembly of claim 2 wherein the elongated spring member slides on the bearing surface as the load beam pivots about the transverse axis.

5. The load beam assembly of claim 2 wherein the elongated spring member comprises stainless steel.

6. The load beam assembly of claim 5 wherein the stainless steel is cold rolled, austenitic, stainless steel.

7. The load beam assembly of claim 2 wherein the elongated spring member produces a predetermined gram load with a predetermined spring rate by being formed from a predetermined material of a predetermined thickness, length, and width.

8. The load beam assembly of claim 1 wherein the hinge means comprises two surfaces in rubbing contact with one another.

9. The load beam assembly of claim 8 wherein the two surfaces of the hinge means comprise a cylindrical hinge pin and a cylindrical aperture.

10. The load beam assembly of claim 1 wherein the hinge means comprises a metal strip.

11. The load beam assembly of claim 10 wherein the hinge means comprises a plurality of metal strips.

12. The load beam assembly of claim 11 wherein the plurality of metal strips carry electric signal to and from the transducer head.

13. The load beam assembly of claim 1 wherein the hinge means comprises a flex circuit which also carries electric signals to and from the transducer head.

14. A load beam assembly for attachment to an actuator arm and for carrying a transducer head, the load beam assembly comprising:

a base portion having a base actuator end and a base hinge end;

an elongated load beam having a load beam hinge end, a load beam gimbal end, and a bearing surface;

hinge means joining the base hinge end to the load beam hinge end, the hinge means defining a transverse axis;

the base portion, the load beam, and the hinge means being positioned to define a longitudinal axis extending from the base portion to the load beam gimbal end;

gimbal means for supporting the transducer head, the gimbal means being attached to the load beam gimbal end; and a spring member having opposite ends, a near end fixed relative to the base portion, and a far end contacting the bearing surface;

whereby the spring member applies a gram load to the gimbal means via the bearing surface as the load beam pivots about the transverse axis, thereby allowing a narrow range of gram load variation over a wide range of manufactured load beam assemblies; and wherein the hinge means comprises a ball and socket.

15. A load beam assembly for attachment to an actuator arm and for carrying a transducer head, the load beam assembly comprising:

a base portion having a base actuator end and a base hinge end;

an elongated load beam having a load beam hinge end, a load beam gimbal end, and a bearing surface;

hinge means joining the base hinge end to the load beam hinge end, the hinge means defining a transverse axis;

the base portion, the load beam, and the hinge means being positioned to define a longitudinal axis extending from the base portion to the load beam gimbal end;

gimbal means for supporting the transducer head, the gimbal means being attached to the load beam gimbal end; and a spring member having opposite ends, a near end fixed relative to the base portion, and a far end contacting the bearing surface;

whereby the spring member applies a gram load to the gimbal means via the bearing surface as the load beam pivots about the transverse axis thereby allowing a narrow range of gram load variation over a wide range of manufactured load beam assemblies; and wherein the hinge means comprises a knife edge and socket.

16. A load beam assembly for attachment to an actuator arm and for carrying a transducer head, the load beam assembly comprising:

a base portion having a base actuator end and a base hinge end;

an elongated load beam having a load beam hinge end, a load beam gimbal end, and a bearing surface;

hinge means joining the base hinge end to the load beam hinge end, the hinge means defining a transverse axis;

the base portion, the load beam, and the hinge means being positioned to define a longitudinal axis extending from the base portion to the load beam gimbal end;

gimbal means for supporting the transducer head, the gimbal means being attached to the load beam gimbal end; and a spring member having opposite ends, a near end fixed relative to the base portion, and a far end contacting the bearing surface;

whereby the spring member applies a gram load to the gimbal means via the bearing surface as the load beam pivots about the transverse axis, thereby allowing a narrow range of gram load variation over a wide range of manufactured load beam assemblies; and wherein the hinge means comprises plastic.

17. The load beam assembly of claim 16 wherein the plastic hinge means comprises a living hinge.

18. The load beam assembly of claim 16 wherein the base portion and the load beam also comprise plastic.

19. The load beam assembly of claim 18 wherein the plastic is unfilled polypropylene.

20. The load beam assembly of claim 18 wherein the plastic hinge means, base portion, and load beam are all part of an integral, injection molded component.

21. The load beam assembly of claim 20 wherein the plastic hinge means is a living hinge formed from a region of reduced thickness between the base portion and the load beam.

22. The load beam assembly of claim 21 wherein the living hinge region is substantially shorter along the longitudinal axis than along the transverse axis so that the load beam may freely pivot up and down about the transverse axis (pitch), but not about the longitudinal axis (roll) or a vertical axis (yaw).

23. A head stack assembly for a magnetic disk drive having a coil, an actuator body, an actuator arm, and a head gimbal assembly for carrying a transducer head over a magnetic disk and applying a gram load to the transducer head, the head gimbal assembly comprising:

a transducer head for reading recorded magnetic data;

connection means for carrying signals from the transducer head;

a load beam assembly comprising:

a base portion having a base actuator end and a base hinge end;

an elongated load beam having a load beam hinge end, a load beam gimbal end, a first surface facing towards the disk and a second surface facing away from the disk, and a bearing surface;

hinge means joining the base hinge end to the load beam hinge end, the hinge means defining a transverse axis;

the base portion, the load beam, and the hinge means being positioned to define a longitudinal axis extending from the base portion to the load beam gimbal end;

gimbal means for supporting the transducer head, the gimbal means being attached to the load beam gimbal end; and a spring member having opposite ends, a near end fixed relative to the base portion, and a far end for slidably contacting the bearing surface;

the far end of the spring member positioned between the second surface and the transducer head;

whereby the spring member applies a gram load to the gimbal means via the bearing surface as the load beam pivots about the transverse axis, thereby allowing a narrow range of gram load variation over a wide range of manufactured load beam assemblies.

24. The head stack assembly of claim 23 wherein the spring member is an elongated spring member arching along the longitudinal axis.

25. The head stack assembly of claim 24 wherein the near end of the elongated spring member is fixed directly to the base portion.

26. The head stack assembly of claim 24 wherein the elongated spring member slides on the bearing surface as the load beam pivots about the transverse axis.

27. The head stack assembly of claim 24 wherein the elongated spring member comprises stainless steel.

28. The head stack assembly of claim 27 wherein the stainless steel is cold rolled, austenitic, stainless steel.

29. The head stack assembly of claim 27 wherein the elongated spring member produces a predetermined gram load with a predetermined spring rate by being formed from a predetermined material of a predetermined thickness, length, and width.

30. The head stack assembly of claim 23 wherein the hinge means comprises a ball and socket.

31. The head stack assembly of claim 23 wherein the hinge means comprises a knife edge and socket.

32. The head stack assembly of claim 23 wherein the hinge means comprises two surfaces in rubbing contact with one another.

33. The head stack assembly of claim 32 wherein the two surfaces of the hinge means comprise a cylindrical hinge pin and a cylindrical aperture.

34. The head stack assembly of claim 23 wherein the hinge means comprises a metal strip.

35. The head stack assembly of claim 34 wherein the hinge means comprises a plurality of metal strips.

36. The head stack assembly of claim 35 wherein the plurality of metal strips carry electric signal to and from the transducer head.

37. The head stack assembly of claim 23 wherein the hinge means comprises a flex circuit which also carries electric signals to and from the magnetic head.

38. A head stack assembly for a magnetic disk drive having a coil, an actuator body, an actuator arm, and a head gimbal assembly for carrying a transducer head over a magnetic disk and applying a gram load to the transducer head, the head gimbal assembly comprising:

a transducer head for reading recorded magnetic data;

connection means for carrying signals from the transducer head;

a load beam assembly comprising:

a base portion having a base actuator end and a base hinge end;

an elongated load beam having a load beam hinge end, a load beam gimbal end, and a bearing surface;

hinge means joining the base hinge end to the load beam hinge end, the hinge means defining a transverse axis;

the base portion, the load beam, and the hinge means being positioned to define a longitudinal axis extending from the base portion to the load beam gimbal end;

gimbal means for supporting the transducer head, the gimbal means being attached to the load beam gimbal end; and a spring member having opposite ends, a near end fixed relative to the base portion, and a far end contacting the bearing surface;

whereby the spring member applies a gram load to the gimbal means via the bearing surface as the load beam pivots about the transverse axis, thereby allowing a narrow range of gram load variation over a wide range of manufactured load beam assemblies; and wherein the hinge means comprises plastic.

39. The head stack assembly of claim 38 wherein the plastic hinge means comprises a living hinge.

40. The head stack assembly of claim 38 wherein the base portion and the load beam also comprise plastic.

41. The head stack assembly of claim 40 wherein the plastic is unfilled polypropylene.

42. The head stack assembly of claim 40 wherein the plastic hinge means, base portion, and load beam are all part of an integral, injection molded component.

43. The head stack assembly of claim 42 wherein the plastic hinge means is a living hinge formed from a region of reduced thickness between the base portion and the load beam.

44. The head stack assembly of claim 43 wherein the living hinge region is substantially shorter along the longitudinal axis than along the transverse axis so that the load beam may freely pivot up and down about the transverse axis (pitch), but not about the longitudinal axis (roll) or a vertical axis (yaw).

45. A magnetic disk drive having a disk and a head stack assembly, the head stack assembly having a coil, an actuator body, an actuator arm, and a head gimbal assembly for carrying a transducer head over a magnetic disk and applying a gram load to the transducer head, the head gimbal assembly comprising:

a transducer head for reading recorded magnetic data;

connection means for carrying signals from the transducer head;

a load beam assembly comprising:

a base portion having a base actuator end and a base hinge end;

an elongated load beam having a load beam hinge end, a load beam gimbal end, a first surface facing towards the disk and a second surface facing away from the disk and a bearing surface;

hinge means joining the base hinge end to the load beam hinge end, the hinge means defining a transverse axis;

the base portion, the load beam, and the hinge means being positioned to define a longitudinal axis extending from the base portion to the load beam gimbal end;

gimbal means for supporting the transducer head, the gimbal means being attached to the load beam gimbal end; and a spring member having opposite ends, a near end fixed relative to the base portion, and a far end for slidably contacting the bearing surface;

the far end of the spring member positioned between the second surface and the transducer head;

whereby the spring member applies a gram load to the gimbal means via the bearing surface as the load beam pivots about the transverse axis, thereby allowing a narrow range of gram load variation over a wide range of manufactured load beam assemblies.

46. The magnetic disk drive of claim 45 wherein the spring member is an elongated spring member arching along the longitudinal axis.

47. The magnetic disk drive of claim 46 wherein the near end of the elongated spring member is fixed directly to the base portion.

48. The magnetic disk drive of claim 46 wherein the elongated spring member slides on the bearing surface as the load beam pivots about the transverse axis.

49. The magnetic disk drive of claim 46 wherein the elongated spring member comprises stainless steel.

50. The magnetic disk drive of claim 49 wherein the stainless steel is cold rolled, austenitic, stainless steel.

51. The magnetic disk drive of claim 46 wherein the elongated spring member produces a predetermined gram load with a predetermined spring rate by being formed from a predetermined material of a predetermined thickness, length, and width.

52. The magnetic disk drive of claim 45 wherein the hinge means comprises a ball and socket.

53. The magnetic disk drive of claim 45 wherein the hinge means comprises a knife edge and socket.

54. The magnetic disk drive of claim 45 wherein the hinge means comprises two surfaces in rubbing contact with one another.

55. The magnetic disk drive of claim 54 wherein the two surfaces of the hinge means comprises a cylindrical hinge pin and a cylindrical aperture.

56. The magnetic disk drive of claim 45 wherein the hinge means comprises a metal strip.

57. The magnetic disk drive of claim 56 wherein the hinge means comprises a plurality of metal strips.

58. The magnetic disk drive of claim 57 wherein the plurality of metal strips carry electric signal to and from the transducer head.

59. The magnetic disk drive of claim 45 wherein the hinge means comprises a flex circuit which also carries electric signals to and from the magnetic head.

60. A magnetic disk drive having a disk and a head stack assembly, the head stack assembly having a coil, an actuator body, an actuator arm, and a head gimbal assembly for carrying a transducer head over a magnetic disk and applying a gram load to the transducer head, the head gimbal assembly comprising:

a transducer head for reading recorded magnetic data;

connection means for carrying signals from the transducer head;

a load beam assembly comprising:

a base portion having a base actuator end and a base hinge end;

an elongated load beam having a load beam hinge end, a load beam gimbal end, and a bearing surface;

hinge means joining the base hinge end to the load beam hinge end, the hinge means defining a transverse axis;

the base portion, the load beam, and the hinge means being positioned to define a longitudinal axis extending from the base portion to the load beam gimbal end;

gimbal means for supporting the transducer head, the gimbal means being attached to the load beam gimbal end; and a spring member having opposite ends, a near end fixed relative to the base portion, and a far end contacting the bearing surface;

whereby the spring member applies a gram load to the gimbal means via the bearing surface as the load beam pivots about the transverse axis, thereby allowing a narrow range of gram load variation over a wide range of manufactured load beam assemblies; and wherein the hinge means comprises plastic.

61. The magnetic disk drive of claim 60 wherein the plastic hinge means comprises a living hinge.

62. The magnetic disk drive of claim 60 wherein the base portion and the load beam also comprise plastic.

63. The magnetic disk drive of claim 62 wherein the plastic is unfilled polypropylene.

64. The magnetic disk drive of claim 62 wherein the plastic hinge means, base portion, and load beam are all part of an integral, injection molded component.

65. The magnetic disk drive of claim 64 wherein the plastic hinge means is a living hinge formed from a region of reduced thickness between the base portion and the load beam.

66. The magnetic disk drive of claim 65 wherein the living hinge region is substantially shorter along the longitudinal axis than along the transverse axis so that the load beam may freely pivot up and down about the transverse axis (pitch), but not about the longitudinal axis (roll) or a vertical axis (yaw).

* * * * *